(12) United States Patent
Waggener (10) Patent No.: US 10,464,373 B1
(45) Date of Patent: Nov. 5, 2019

(54) CASTER WHEEL LIFT AND BRAKE ASSEMBLY

(71) Applicant: Herbert A Waggener, Chippewa Falls, WI (US)

(72) Inventor: Herbert A Waggener, Chippewa Falls, WI (US)

( * ) Notice: Subject to any disclaimer, the term of this patent is extended or adjusted under 35 U.S.C. 154(b) by 0 days.

(21) Appl. No.: 16/014,618

(22) Filed: Jun. 21, 2018

Related U.S. Application Data (60) Provisional application No. 62/524,674, filed on Jun. 26, 2017.

(51) Int. Cl.
*B60B 33/02* (2006.01)
*B60B 33/00* (2006.01)

(52) U.S. Cl.
CPC ........ *B60B 33/023* (2013.01); *B60B 33/0036* (2013.01); *B60B 33/0049* (2013.01); *B60B 33/0068* (2013.01); *B60B 2900/551* (2013.01)

(58) Field of Classification Search
CPC .............. B60B 33/023; B60B 33/0036; B60B 33/0049; B60B 33/0068; B60B 2900/551; Y10T 16/218
See application file for complete search history.

(56) References Cited

U.S. PATENT DOCUMENTS

| | | | |
|---|---|---|---|
| 1,066,754 A | * | 7/1913 | Rison .................. B60B 33/0042 16/18 B |
| 1,105,379 A | | 7/1914 | Schuize |
| 1,106,754 A | | 8/1914 | Troxell |
| 1,739,260 A | | 12/1929 | Roe |
| 1,993,131 A | * | 3/1935 | Borgna ..................... F16H 9/16 474/24 |
| 2,123,707 A | | 7/1938 | Bloch |
| 2,701,005 A | | 2/1955 | Bennett et al. |
| 3,009,619 A | * | 11/1961 | Layden ................. B21F 23/002 219/137.7 |

(Continued)

FOREIGN PATENT DOCUMENTS

| | | |
|---|---|---|
| EP | 0127929 B | 2/1988 |
| GB | 2145983 A | 4/1985 |

(Continued)

*Primary Examiner* — Victor D Batson
*Assistant Examiner* — Matthew J Sullivan
(74) *Attorney, Agent, or Firm* — Tipton L. Randall (57) ABSTRACT

A caster wheel assembly includes a vertical axis brake and barrier-traversing member. The caster shaft housing contains a stator surface adjacent the caster wheel assembly. The barrier-traversing member with barrier contact surface is biasedly fastened to the caster wheel assembly. A brake pad member is attached to the barrier-traversing member opposite the barrier contact surface and adjacent the stator surface. In operation, the moving caster wheel assembly first contacts an obstacle with the barrier contact surface of the barrier-traversing member. The encountered obstacle elevates the barrier-traversing member and attached brake pad member into contact with the stator surface of the caster shaft housing, thereby restraining rotation of the caster wheel assembly. Then, further forward movement of the rotation-restrained caster wheel assembly allows the barrier-traversing member to elevate the caster wheel, transfer load to the caster wheel, and thereby more easily traverse the obstacle.

16 Claims, 4 Drawing Sheets

(56) References Cited

U.S. PATENT DOCUMENTS

| | | | |
|---|---|---|---|
| 3,177,733 A * | 4/1965 | Yamano | F16H 55/38 |
| | | | 474/178 |
| 3,239,872 A | 3/1966 | Kitrell | |
| 3,356,327 A * | 12/1967 | Schreyer | A47B 91/024 |
| | | | 248/188.4 |
| 3,540,301 A * | 11/1970 | Bartz | F16G 1/28 |
| | | | 474/148 |
| 3,573,877 A | 4/1971 | Locke | |
| 3,827,718 A | 8/1974 | Curry | |
| 4,098,521 A | 7/1978 | Ferguson et al. | |
| 4,132,423 A | 1/1979 | Chant | |
| 4,246,445 A | 2/1981 | Vassar | |
| 4,349,938 A | 9/1982 | Fontana | |
| 4,432,425 A | 2/1984 | Nitzberg | |
| 4,467,496 A * | 8/1984 | Gregg | B60B 33/045 |
| | | | 16/18 B |
| 4,534,433 A | 8/1985 | Burbank et al. | |
| 4,611,966 A | 3/1986 | Singleton | |
| 4,674,757 A | 6/1987 | Martin | |
| 4,747,611 A | 5/1988 | Daugherty, Jr. | |
| 5,228,709 A | 7/1993 | Kao | |
| 5,482,326 A | 1/1996 | Levi | |
| 5,562,172 A | 10/1996 | Mick | |
| 5,899,469 A | 5/1999 | Pinto et al. | |
| 5,964,473 A | 10/1999 | Degonda et al. | |
| 6,129,165 A | 10/2000 | Schaffner et al. | |
| 6,325,398 B1 | 12/2001 | Banzi | |
| 6,371,502 B1 | 4/2002 | Howlett et al. | |
| 6,668,965 B2 | 12/2003 | Strong | |
| 6,712,369 B2 | 3/2004 | Wu | |
| 6,752,400 B2 | 6/2004 | Nakatsukosa et al. | |
| 7,036,185 B2 | 5/2006 | Morndal et al. | |
| 7,406,745 B2 | 8/2008 | Chou | |
| 7,540,504 B2 | 6/2009 | Ehman et al. | |
| 7,620,003 B2 | 11/2009 | Myers et al. | |
| 7,837,201 B2 | 11/2010 | Cheng et al. | |
| 7,866,430 B2 | 1/2011 | Kakinuma et al. | |
| 8,046,871 B2 * | 11/2011 | Yamauchi | B60B 33/0007 |
| | | | 16/45 |
| 8,079,606 B2 | 12/2011 | Dull et al. | |
| 8,539,640 B1 * | 9/2013 | Waggener | B60B 33/006 |
| | | | 16/18 B |
| 8,650,710 B1 * | 2/2014 | Waggener | B60B 33/006 |
| | | | 16/18 B |
| 2002/0074747 A1 | 6/2002 | Heien | |
| 2004/0135326 A1 | 7/2004 | Palmers et al. | |
| 2006/0267295 A1 | 11/2006 | You | |
| 2007/0056140 A1 | 3/2007 | Yamauchi | |
| 2009/0172915 A1 | 7/2009 | Hunziker | |
| 2010/0162520 A1 | 7/2010 | Yamaguchi | |
| 2010/0175222 A1 | 7/2010 | Fallshaw et al. | |
| 2011/0140377 A1 * | 6/2011 | Sullivan | A61G 5/06 |
| | | | 280/5.32 |
| 2011/0247173 A1 | 10/2011 | Nguyen et al. | |
| 2012/0068423 A1 | 3/2012 | Otterson et al. | |
| 2017/0156254 A1 * | 6/2017 | Kester | A01C 7/203 |

FOREIGN PATENT DOCUMENTS

| | | |
|---|---|---|
| JP | 8225001 | 9/1996 |
| JP | 10297206 | 11/1998 |
| JP | 11020401 | 1/1999 |
| JP | 11091304 | 4/1999 |
| JP | 2002234308 | 8/2002 |
| JP | 2003094906 | 4/2003 |
| JP | 2006281884 | 10/2006 |
| JP | 2007230542 | 9/2007 |
| WO | WO 9001441 | 2/1990 |
| WO | WO 9840253 A1 | 9/1998 |

* cited by examiner

CASTER WHEEL LIFT AND BRAKE ASSEMBLY

CROSS-REFERENCE TO RELATED APPLICATIONS, IF ANY

This application claims the benefit under 35 U.S.C. § 119 (e) of provisional application Ser. No. 62/524,674, filed 26 Jun. 2017. Application Ser. No. 62/524,674 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to caster wheels and, more particularly, to a vertical spin axis brake for caster wheels and, most particularly, to a wheel lift and brake assembly for caster wheels. The description herein is focused on application to wheelchairs, but the invention is applicable to shopping carts, material transport containers, health or other disability-related appliances, and other applications utilizing caster wheels to improve maneuverability.

2. Background Information

Wheel chairs are widely used to contribute to the mobility of persons for whom normal walking is not practical. A number of variations have been made, including various powered and manually propelled devices. Many users of manually powered wheelchairs find it easy to maneuver on flat, hard floors, but have difficulty negotiating over even small obstacles without assistance. In wheelchairs, the weight of the user is generally borne on four wheels; the two larger diameter rear drive wheels, and the two smaller caster wheels, typically located in the front. For flat surfaces, chair motion is controlled by muscle power applied by grasping the propulsion handrails, thereby inducing forward, reverse, or turning wheelchair motions. The large drive wheels are intended to carry much of the load, while the smaller diameter casters provide sufficient support such that the user is unlikely to tip over forward or backward. Overall structural support is provided by the tubular chair frame.

Casters enable 360-degree rotation of each caster wheel about its vertical spin axis, so that in the absence of obstacles and while operating on level surfaces, the direction taken by the wheelchair is controlled solely by the relative forces applied to the drive wheels by the hand rails. Under ideal conditions, such a wheelchair is extremely maneuverable, since the combination of two front caster wheels and two independently driven rear wheels provide motion in any direction.

However, if an obstacle such as a door threshold or elevation change in an otherwise smooth, level surface is encountered, such as buildings with passenger or freight elevators, the situation is more complicated, and the standard suspension system above is more difficult to use. The navigation problem is composed of two parts: (1) While all wheels require some force to overcome obstacles, small diameter wheels require considerably larger forces to overcome obstacles. The caster wheels typically have a much smaller diameter than the larger drive wheels, so as to enable a more compact footprint for the wheelchair, and to permit unfettered turning ability. However, the smaller the castor wheel diameter, the greater the difficulty in overcoming even small obstacles. (2) However, if an obstacle is disposed such that the caster encounters the obstacle in an oblique or off-center manner, the caster wheel may be forced to turn in an undesired direction, making unassisted navigation very difficult or impossible. Both problems are addressed by the current invention. Normal manual wheelchairs are difficult to maneuver over even small obstacles, both for when the obstacle is encountered head on, or even more seriously, obliquely!

The present invention centers on several improvements in the design of manually propelled wheelchairs that are intended to improve their ability to overcome obstacles, such as door thresholds, small changes in elevation, or other deviations from a flat floor. The inventor proposes simple modifications in the design of manual wheelchairs. The proposed modifications are similar, in that means are provided such that as an obstacle is encountered, the obstacle is detected, and a castor spin axis brake is activated so as to resist caster rotation in the early phase of the encounter. As the obstacle is further encountered, the load is transferred to the caster wheel, the spin axis brake is automatically released, and the mechanism is returned to the starting condition. These three embodiments are designated as "Wheelaids."

"Wheelaids" are incorporated into caster wheels. Wheelaids significantly reduce the forces necessary to surmount obstacles without materially changing the maneuverability or ease of operation of wheelchairs so equipped, and add only a little weight. Wheelaids are not intended to allow wheelchairs to negotiate curbs, stairs, or other similar larger obstacles. Wheelaids can also be applied to powered wheelchairs, potentially resulting in lower motor torque requirements, lighter designs, or longer cruising ranges. Several variations of wheelaids are described below.

SUMMARY OF THE INVENTION

The invention is applicable to caster wheels and incorporates a variable pivot and a vertical axis caster and rotational brake. In a preferred embodiment of the invention, the caster wheel assembly having a caster-axis brake and a barrier-traversing member comprises a caster support body having a vertical caster shaft with a shaft axis therein. The vertical caster shaft is pivotally engaged within a caster shaft housing having a brake stator surface adjacent the caster support body. At least one caster wheel is mounted on a horizontal axle in the caster support body opposite the caster shaft, with the horizontal axle offset from the vertical axis of the caster shaft. At least one barrier-traversing member is biasedly fastened to the caster support body. The barrier-traversing member includes a barrier contact surface adjacent to and aligned in parallel with said caster wheel. The barrier contact surface extends opposite said caster wheel and preferably beyond the vertical axis of the caster shaft. A brake pad member is attached to the barrier contact member opposite the barrier contact surface and adjacent the stator surface of the caster shaft housing. In operation, the moving caster wheel assembly first contacts an obstacle with the barrier contact surface of the barrier-traversing member. The encountered obstacle begins to elevate the barrier-traversing member with lesser force and easily brings the attached brake pad member into contact with the brake stator surface of the caster support body, thereby maintaining the orientation of the caster support body and said caster wheel thereof. Then, further forward movement of the directionally restrained caster wheel assembly allows the barrier-traversing member to elevate said caster wheel, transfer the load to the caster wheel, allow the barrier-traversing member to return to it's starting position, and the caster wheel to more easily traverse the obstacle.

In a preferred embodiment of the invention, the caster wheel assembly includes a belt member, encircling both the caster wheel and a raised barrier contact wheel/pulley. This embodiment is termed a "Wheelramp." A further feature includes an adjustable length barrier-traversing member, as discussed in the first and second embodiments above.

DESCRIPTION OF THE EMBODIMENTS

Nomenclature

Figure 2:
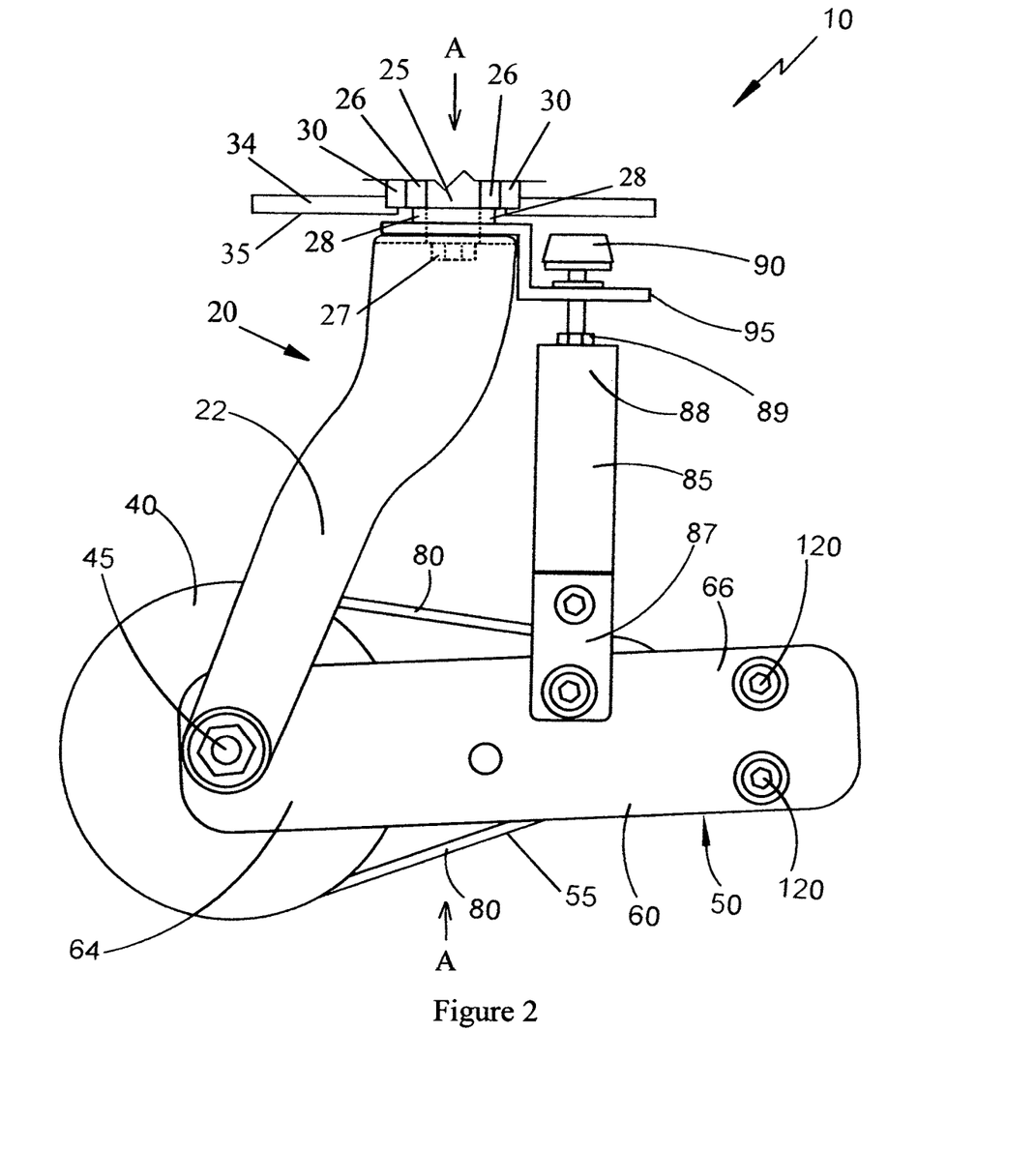
FIG. 2 is an elevated perspective side view of a prototype embodiment of the caster wheel assembly with a vertical axis brake and barrier-traversing member of the present invention. The brake pad actuator/support includes a support rod opposite the pulley wheel support arm. The support rod movably extends through the wheelramp upper support bracket. The brake pad is attached at the upper end of the brake pad support rod and positioned adjacent the brake stator, as illustrated. This prototype iteration Waggener Casters (Wheelramps) is mounted on a manual wheelchair.
Figure 3:
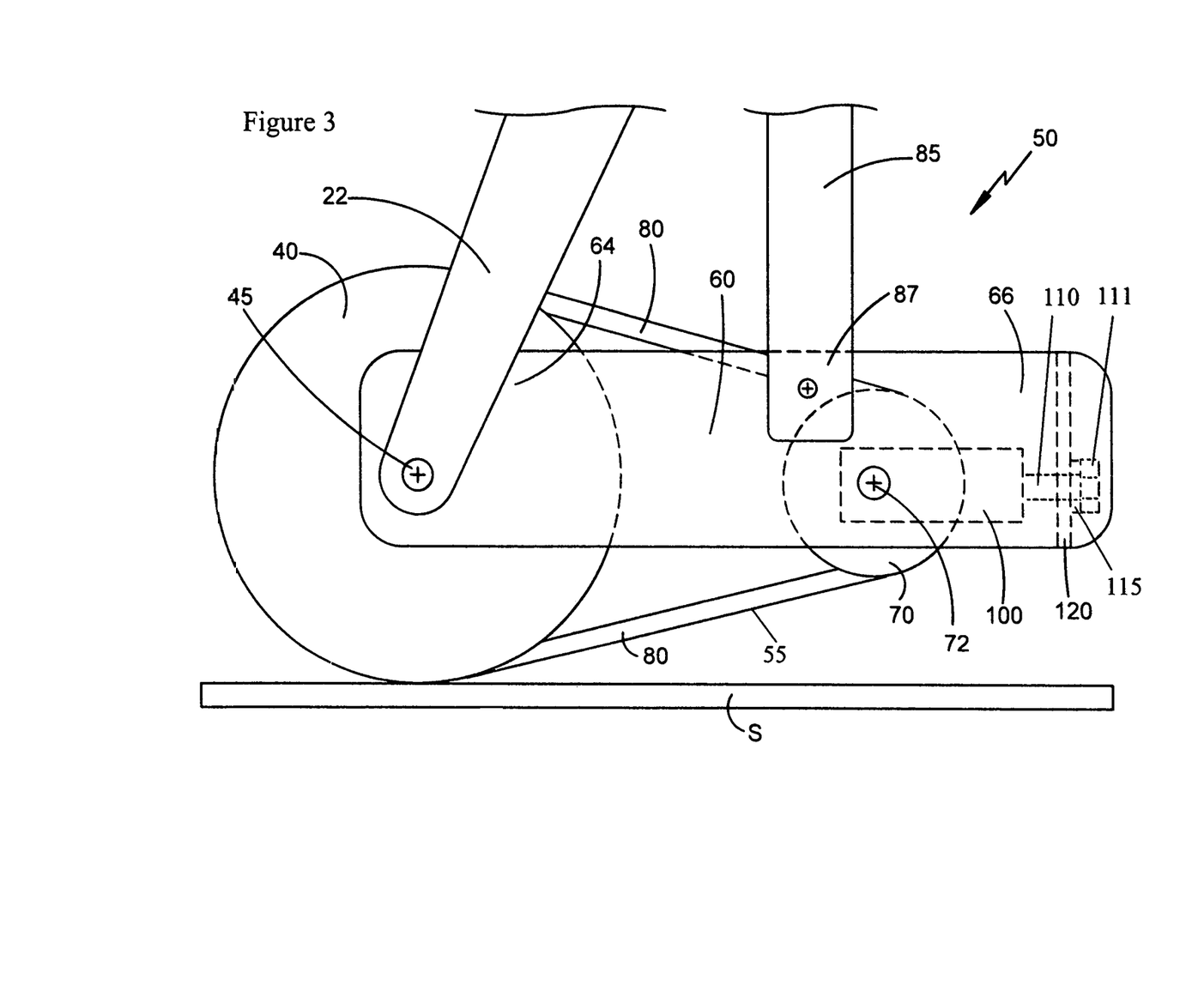
FIG. 3 is an enlarged perspective side view of the lower portion of the embodiment of the caster wheel assembly of FIG. 2.
Figure 4:
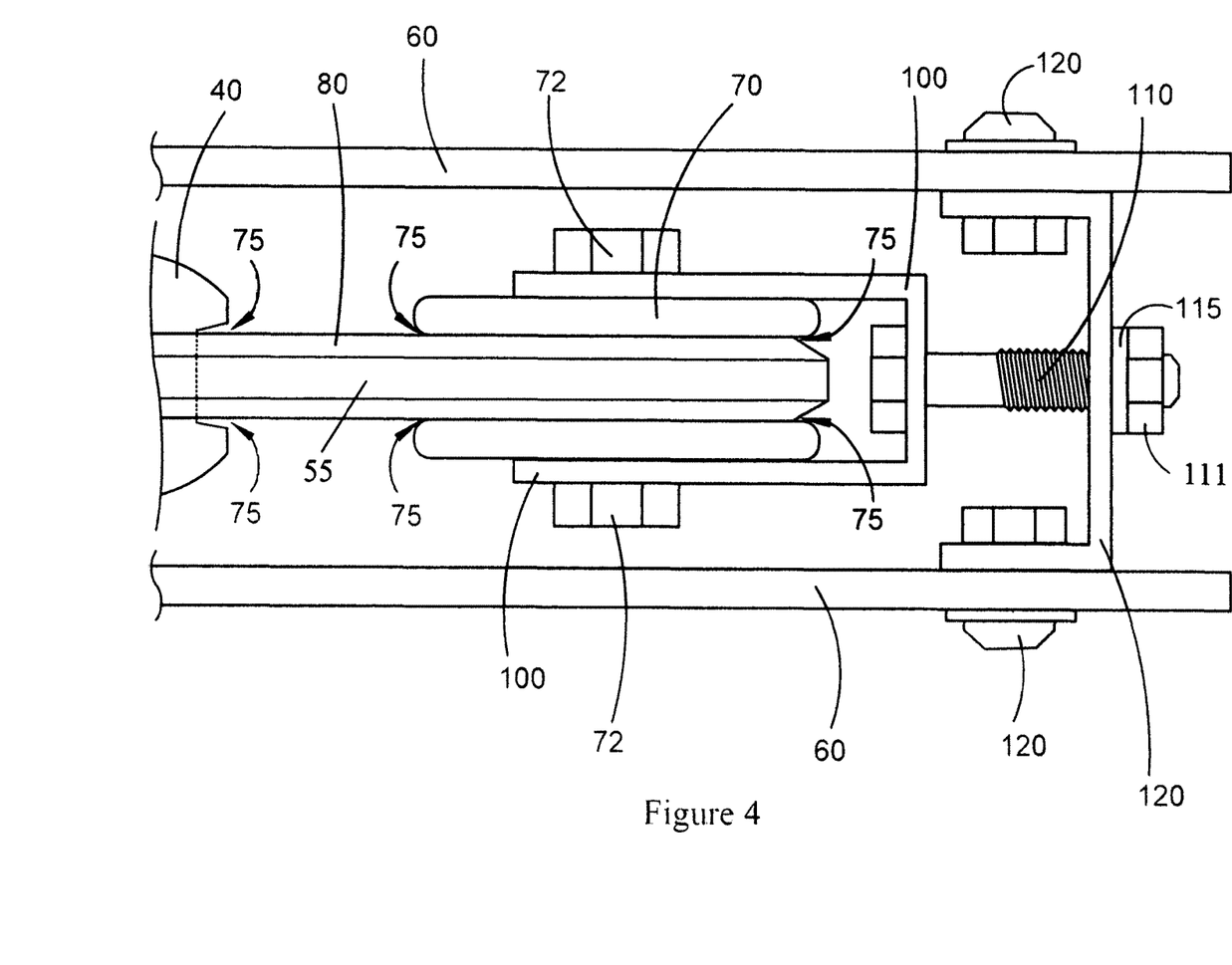
FIG. 4 is a bottom perspective view of a further embodiment of the caster wheel assembly with a vertical axis brake and barrier-traversing member of FIG. 3.

10 Caster Wheel Assembly
20 Caster Support Body
22 Arms of Caster Support Body
25 Caster Shaft
26 Bearing
27 Vertical Castor Shaft Retaining Nut
28 Thrust Washer
30 Caster Shaft Housing
34 Brake Stator Disc
35 Brake Stator Surface
40 Caster Wheel
45 Axle of Caster Wheel
50 Barrier Traversing Member
55 Barrier Contact Surface
60 Parallel Support Arms
64 First End of Support Arms
66 Second End of Support Arms
70 Pulley Wheel
72 Axle of Pulley Wheel
75 Circumferential Groove
80 Wheel Ramp Belt Member
85 Brake Pad Support Member
87 First End of Support Member
88 Second End of Support Member
89 Adjustment Nut
90 Brake Pad Member
95 Brake Pad Driver/Support Bracket
100 U-Shaped Clevis
110 Clevis Adjustment Bolt
111 Nut of Clevis Adjustment Bolt
115 Belleville Washers
120 Adjustment Fastener Support
A-A Vertical Axis of Caster Shaft
S Support Surface Construction The embodiments of the present invention are disclosed employing FIGS. 2-4. These Figures illustrate the various elements of the present invention and the operational advantages inherent in the disclosed structures and their various interactions.

Figure 1:
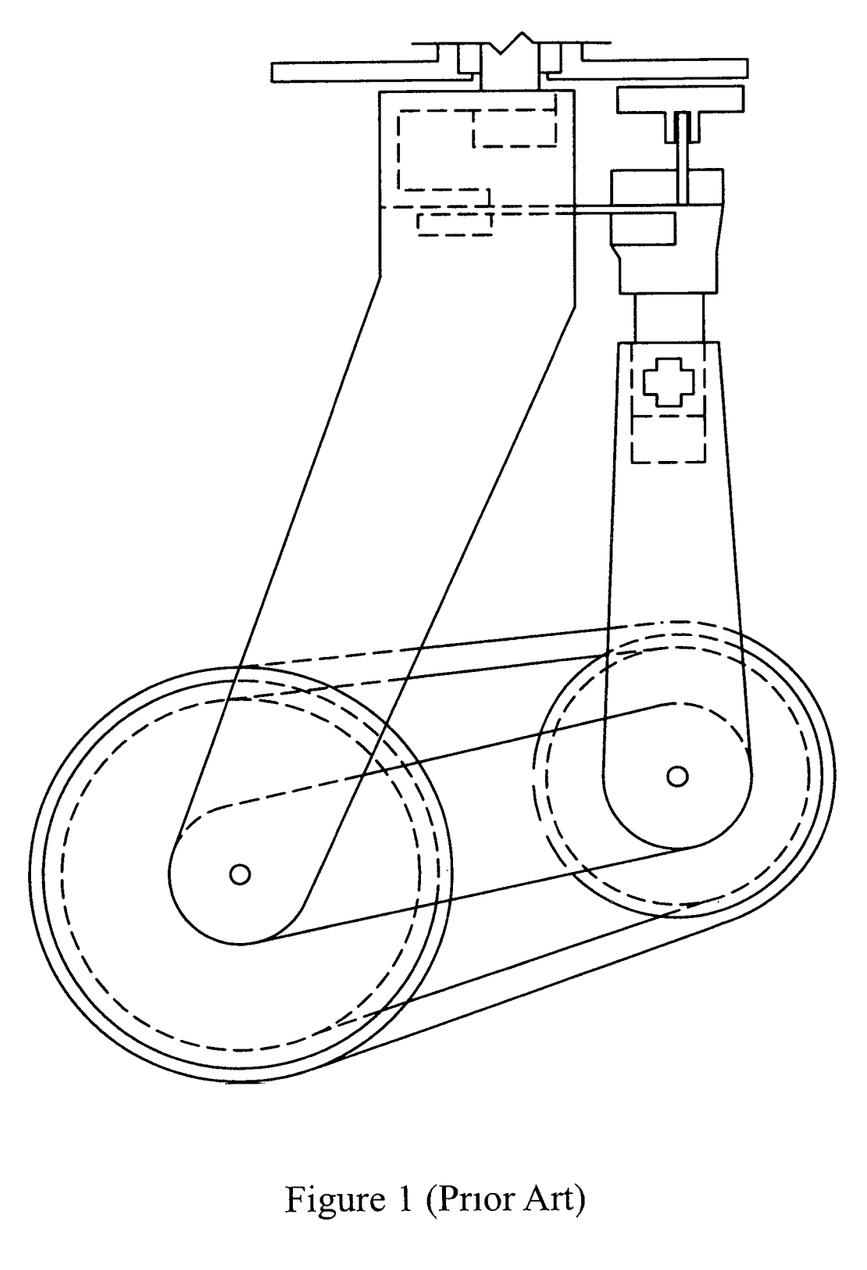
FIG. 1 is a perspective side view of an embodiment of the caster wheel assembly with a vertical axis brake and barrier-traversing member disclosed in U.S. Pat. Nos. 8,539,640 and 8,650,710. The various arrangements described therein are called Waggener Casters.

FIG. 1 is a perspective side view of an embodiment of the caster wheel assembly with a vertical axis brake and barrier-traversing member disclosed in U.S. Pat. Nos. 8,539,640 and 8,650,710. The various arrangements described therein are called Waggener Casters. A usual caster consists of a wheel mounted on a horizontal axis, disposed rearward from a vertical axis shaft located on the bottom of a vehicle, such as a wheelchair, shopping cart, or industrial cartage. The radius of the caster wheel typically ranges from two to four inches to save space. Such wheels intended for home use have a radius of about four inches, while wheelchairs for hospital use are typically fitted with caster wheels of about two inch radius or less. A small caster radius makes overcoming even small obstacles difficult. The previously disclosed Waggener Caster reduces the force needed to overcome an obstacle by introducing a secondary wheel/pulley and belt arrangement to form a built-in ramp.

FIG. 1 is an elevated perspective side view of the earlier embodiment of the caster wheel assembly with a vertical axis brake and barrier-traversing member. These caster wheel assemblies are mounted on a manual wheelchair. The caster wheels contain circumferential grooves that are machined to accommodate commercial V-belts, which function as wheel ramp belt members. The V-belts incorporate Kevlar cords, and belt tensioning was established by construction alone. Initial results were encouraging, as ¾ inch high barriers were easily overcome, but it became apparent that the belt tension was inadequate to establish acceptable ramp characteristics. The wheel ramp belt member excessively sagged upwardly when heavily loaded, somewhat reducing the positive ramp effect. Applicant has incorporated unique modifications into the Waggener Caster to overcome these drawbacks. These modifications provide significant improvements over the prior art.

In the broadest embodiment, illustrated in FIGS. 2-4, the caster wheel assembly 10 of the present invention has a vertical axis (A-A) brake and barrier-traversing member. The assembly 10 includes a caster support body 20 having two castor support arms 22 and having a caster shaft 25 with a vertical shaft axis A-A therein. The caster shaft 25 rotationally engaged within a caster shaft housing 30 having a brake stator body 34 with a brake stator surface 35 adjacent the caster support body 20, as shown in FIG. 2.

At least one caster wheel 40 is mounted on an axle 45 in the caster support body 20 opposite the caster shaft 25, the axle 45 offset from the vertical axis A-A of the caster shaft 25. A barrier-traversing member 50 is pivotally fastened to the axle 45 of the at least one caster wheel 40 of the caster support body 20, the barrier-traversing member 50 including a barrier contact surface 55 adjacent to and aligned in parallel with the at least one caster wheel 40. The barrier contact surface 55 extends opposite the at least one caster wheel 40 and beyond the vertical axis A-A of the caster shaft 25.

As seen in FIGS. 3 and 4, the barrier-traversing member 50 includes a pair of parallel support arms 60, each arm pivotally attached at a first end 64 to the axle 45 of the caster wheel 40 and adjustably retaining a pulley wheel 70 there between adjacent a second end 66 of the pair of support arms 60. The at least one caster wheel 40 and the pulley wheel 70 each include a circumferential groove 75 therein with a wheel ramp belt member 80 encircling the at least one caster wheel 40 and the pulley wheel 70, the belt member 80 positioned in said circumferential groove 75 of said caster wheel 40 and said pulley wheel 70.

A brake pad driver member 85 is attached at a first end 87 to the barrier-traversing member 50 opposite the barrier contact surface 55, and extends toward the brake stator surface 35 of the brake stator disc 34 secured to the caster shaft housing 30. The second end 88 of the brake pad driver member 85 has a brake pad member 90 secured thereto, the brake pad member 90 positioned adjacent the stator surface 35 of the brake stator disc 34, adjacent the caster support body 20.

In operation, as the caster wheel assembly 10 moves toward an obstacle, the moving caster wheel assembly 10 first contacts the obstacle with the barrier contact surface 55 of the barrier-traversing member 50, thereby elevating the barrier-traversing member 50 and connected brake pad driver member 85 and attached brake pad member 90 into contact with the brake stator surface 35 of the caster shaft housing 30, thereby restraining rotation of the caster support body 20 and the at least one caster wheel 40 thereof. Further movement of the rotation-restrained caster wheel assembly 40 allows the barrier-traversing member 50 to elevate the at least one caster wheel 40, transferring load to said caster wheel 40, thereby allowing the barrier-traversing member 50 to return to it's starting position, and thereby to more easily traverse the obstacle.

FIG. 3 is an enlarged view of the bottom portion of the caster wheel assembly 10 contacting a support surface S.

FIG. 4 is bottom perspective view of a preferred embodiment of the caster wheel assembly 10 of the present invention. Several further embodiments of the present invention include: (1) The circumferential groove 75 of the caster wheel 40 and the pulley wheel 70 are modified to accommodate an inverted V-belt member 80, with the groove 75 in the caster wheels 40 shaped so as to allow space between the edges of the V-belt member 80 and the sides of the grooves 85, to further reduce friction due to possible misalignment. (2) An inverted V-belt member 80 reduces belt-induced friction, and places the tensioning cords closer to the bottom of the circumferential grooves 75, reducing any thickness reduction resulting from tensioning. V-belt example materials include urethane, steel reinforced timing belts, and other belts equipped with, for example, carbon fiber cords and with other cross sections. (3) The axle 72 of the pulley wheel 70 is now mounted and supported by a U-shaped clevis 100 attached to an adjustment bolt fastener 110. The adjustment bolt fastener 110 is supported by adjustment fastener support 120 secured between the parallel support arms 60 of the barrier traversing member 50. (4) Belleville washers 115 added under the tensioning nut 111 of the adjustment bolt fastener 110 ensure more consistent belt tensioning under various conditions, including temperature and wear. It should be noted that the axle 72 of the pulley wheel 70 is not attached to the support arms 60, but to the clevis 100 fastened to a tensioning adjustment nut 111 and bolt 110 secured to the pulley wheel support arms 60 of the device.

FIGS. 2 and 3 are perspective side views of the preferred embodiment of the caster wheel assembly 10 showing attachment of the wheelramp assembly 10 to a wheelchair caster fork using a Wheelramp upper/front support bracket 95 and the two Wheelramp support arms 60, which has been separated from the caster wheel support axle 45. This arrangement enables assembly of the Wheelramp assembly package onto the wheelchair without requiring machining of any wheelchair components. However, different models may be needed for different wheelchair designs.

This embodiment includes a vertical axis brake and barrier-traversing member 50. The brake pad driver/support includes a support rod 85 opposite the pulley support arms 60. The driver/support rod 85 moveably extends through a Wheelramp support bracket 95, and the rod 85 is fitted with a Wheelramp angle adjustment nut 89. The Wheelramp angle adjustment nut 89 both allows the ramp angle to be easily changed, as well as providing additional vertical strength against downward forces that might occur to the overall assembly. The brake pad member 90 is attached at the upper end of the brake pad driver rod 85 and positioned adjacent the brake stator surface 35.

Wheelchair caster support bodies 20, also termed caster forks, consist of two caster support arms 22 fabricated from a single piece of steel bent into the fork "U" shape, and attached to the vertical caster axis shaft 25, which is fitted with an integral axle flange and a thrust washer 28. A retaining nut 27 is located on the underside side of the fork. The Wheelramp upper/front support bracket 95 and the thrust washer 28 are fabricated so that the inner face of the bearing 26 rests upon the bracket and thus is prevented from rotation by the upper caster support arms 22. Thus, when the combination is united with the wheelchair with a nut at the upper end of the vertical caster shaft 25, the support bracket 95 forms a strong, properly aligned, and and the thrust washer 28 are fully constrained, according to the original wheelchair design intent. In addition, the bracket 95 is designed to be near the arms of the caster support body 22, further restraining relative rotation.

Attachment of the caster Wheelramp assembly 10 at the Caster Wheelramp support axle 25 completes a triangular support assembly with exceptional strength in three dimensions, and facilitates better applicability of caster Wheelramps 10 to various wheelchair designs. This singular feature greatly improves the number of wheelchairs which could be updated to include caster Wheelramps 10, without needing significant modification of the wheel forks 22 or the wheelchairs themselves. Most preferably, the wheel ramp unit 10 of the present invention is intended to simply attach to existing wheelchairs, as opposed to modification of the wheelchair design to incorporate the wheel ramp assembly 10.

The wheelramp assembly 10 should use the largest wheel diameter consistent with space limitations. When the barrier/belt contact point has progressed so as to achieve contact with the caster wheel 40, further forward motion is a caster wheel/barrier interaction. For the reason discussed herein, the altitude of this last interaction is thereby minimized.

Other potential application of the present technology includes carts, gurneys, walkers, and various industrial cartage devices. These additional implementations are expected to improve user transit where surfaces are not perfectly flat.

Small elevation changes of up to 1.5 inches or so caused by door thresholds, frost heaves, uneven ground settling, vertical positioning errors by passenger or freight elevators, or other imperfections will have less impact on cartage transport, improve user satisfaction, and reduce maintenance costs.

While the invention has been particularly shown and described with reference to preferred embodiments thereof, it will be understood by those skilled in the art that various changes in form and details may be made therein without departing from the spirit and scope of the invention.

I claim:

1. A caster wheel assembly having a vertical axis brake and barrier-traversing member comprising:
   a caster support body having a caster shaft with a vertical shaft axis therein, the caster shaft pivotally engaged within a caster shaft housing having a stator surface adjacent the caster support body;
   at least one caster wheel mounted on an axle in the caster support body opposite the caster shaft, the axle offset from the vertical axis of the caster shaft;
   a barrier-traversing member pivotally fastened to the axle of the at least one caster wheel of the caster support body, the barrier-traversing member including a barrier contact surface aligned in parallel with the at least one caster wheel, the barrier contact surface extending opposite the at least one caster wheel and beyond the vertical axis of the caster shaft;
   the barrier-traversing member including a pair of parallel support arms, each arm pivotally attached at a first end to the axle of the at least one caster wheel and adjustably retaining a pulley wheel there between adjacent a second end of the pair of support arms, the pulley wheel mounted on an axle secured within a U-shaped clevis, said clevis maintained by an adjustment fastener secured between the pair of support arms;
   the at least one caster wheel and the pulley wheel each include a circumferential groove therein with a wheel ramp belt member encircling the at least one caster wheel and the pulley wheel, the belt member positioned in said circumferential groove of said at least one wheel and said pulley wheel;
   a brake pad support member attached at a first end to the barrier-traversing member opposite the barrier contact surface and extending toward the brake stator surface of the caster shaft housing, the brake pad support member second end having a brake pad member secured thereto, the brake pad member positioned adjacent the stator surface adjacent the caster support body; and
   whereby the moving caster wheel assembly first contacts an obstacle with the barrier contact surface of the bather-traversing member, thereby elevating the barrier-traversing member and attached brake pad support member and attached brake pad member into contact with the brake stator surface of the caster shaft housing, thereby restraining rotation of the caster support body and the at least one caster wheel thereof; and
   further movement of the rotation-restrained caster wheel assembly allowing the barrier-traversing member to elevate the at least one caster wheel, transferring load to said caster wheel, thereby allowing the barrier-traversing member to return to its starting position, and more easily traverse the obstacle.

2. The caster wheel assembly having a vertical axis brake and barrier-traversing member of claim 1, further including a brake pad support member bracket secured to the caster support body, the brake pad support member bracket maintaining the brake pad in position to contact the brake stator.

3. The caster wheel assembly having a vertical axis brake and barrier-traversing member of claim 1, wherein the brake stator surface extends radially outward on a surface of the caster shaft housing and surrounds the caster shaft engaged there within.

4. The caster wheel assembly having a vertical axis brake and barrier-traversing member of claim 1, wherein the wheel ramp belt member has a trapezoidal cross section with a wider surface of the belt member contacting the groove on the circumference of said at least one caster wheel and said pulley wheel, thereby allowing space between edges of said V-belt and edges of said circumferential groove of said at least one caster wheel and said pulley wheel.

5. The caster wheel assembly having a vertical axis brake and barrier-traversing member of claim 1, wherein the wheel ramp belt member includes a steel reinforced timing belt.

6. The caster wheel assembly having a vertical axis brake and barrier-traversing member of claim 1, further including belleville washers on the adjustment fastener maintained between the pair of support arms, the belleville washers maintaining tension on the pulley wheel and wheel ramp belt encircling the at least one caster wheel and the pulley wheel.

7. The caster wheel assembly having a vertical axis brake and barrier-traversing member of claim 1, further including an adjustment nut on the brake pad support member, the adjustment nut further maintaining the brake pad in position to contact the brake stator, the brake member support bracket including a portion offset from the brake stator surface providing adjustment of the brake pad member relative to the brake stator surface by the adjustment nut.

8. A caster wheel assembly having a vertical axis brake and barrier-traversing member comprising:
   a caster support body having a caster shaft with a vertical shaft axis therein, the caster shaft pivotally engaged within a caster shaft housing having a stator surface adjacent the caster support body;
   at least one caster wheel mounted on an axle in the caster support body opposite the caster shaft, the axle offset from the vertical axis of the caster shaft;
   a barrier-traversing member pivotally fastened to the axle of the at least one caster wheel of the caster support body, the barrier-traversing member including a barrier contact surface aligned in parallel with the at least one caster wheel, the barrier contact surface extending opposite the at least one caster wheel and beyond the vertical axis of the caster shaft;
   the barrier-traversing member including a pair of parallel support arms, each area pivotally attached at a first end to the axle of the at least one caster wheel and adjustably retaining a pulley wheel there between adjacent a second end of the pair of support arms, the pulley wheel mounted on an axle secured within a U-shaped clevis, said clevis maintained by an adjustment fastener secured between the pair of support arms;
   the at least one caster wheel and the pulley wheel each include a circumferential groove therein with a wheel ramp belt member encircling the at least one caster wheel and the pulley wheel, the belt member positioned in said circumferential groove of said caster wheel and said pulley wheel, said wheel ramp belt member having a trapezoidal cross section with the wider surface of the belt member contacting the groove on the circumference of the caster wheel an pulley wheel, thereby allowing space between edges of said V-belt and edges of said circumferential groove of said at least one caster wheel and said pulley wheel;

a brake pad support member attached at a first end to the barrier-traversing member opposite the barrier contact surface and extending toward the brake stator surface of the caster shaft housing, the brake pad support member second end having a brake pad member secured thereto, the brake pad member positioned adjacent the stator surface adjacent the caster support body;

a brake pad support member bracket secured to the caster support body, the brake pad support member bracket maintaining the brake pad in position to contact the brake stator; and whereby the moving caster wheel assembly first contacts an obstacle with the barrier contact surface of the barrier-traversing member, thereby elevating the barrier-traversing member and attached brake pad support member and attached brake pad member into contact with the brake stator surface of the caster shaft housing, thereby restraining rotation of the caster support body and the at least one caster wheel thereof; and further movement of the rotation-restrained caster wheel assembly allowing the barrier-traversing member to elevate the at least one caster wheel, transferring load to said caster wheel, thereby allowing the barrier-traversing member to return to its starting position, and more easily traverse the obstacle.

9. The caster wheel assembly having a vertical axis brake and barrier-traversing member of claim 8, further including an adjustment nut on the brake pad support member, the adjustment nut further maintaining the brake pad in position to contact the brake stator.

10. The caster wheel assembly having a vertical axis brake and barrier-traversing member of claim 8, wherein the brake pad member is attached to the barrier-traversing member by a support rod guided by a support bracket encircling the vertical caster support axle and associated vertical caster axle flange, thereby engaging the wheelramp parallel arms so as to be rotatable, accurately positioned and strong in three dimensions.

11. The caster wheel assembly having a vertical axis brake and barrier-traversing member of claim 8, wherein the wheel ramp belt member includes a steel reinforced timing belt.

12. The caster wheel assembly having a vertical axis brake and barrier-traversing member of claim 8, further including belleville washers on the adjustment fastener maintained between the pair of support arms, the belleville washers maintaining tension on the pulley wheel and wheel ramp belt encircling the at least one caster wheel and the pulley wheel.

13. The caster wheel assembly having a vertical axis brake and barrier-traversing member of claim 8, further including an adjustment nut on the brake pad support member, the adjustment nut further maintaining the brake pad in position to contact the brake stator, the brake member support bracket including a portion offset from the brake stator surface providing adjustment of the brake pad member relative to the brake stator surface by the adjustment nut.

14. A caster wheel assembly having a vertical axis brake and barrier-traversing member comprising:

a caster support body having a caster shaft with a vertical shaft axis therein, the caster shaft pivotally engaged within a caster shaft housing having a stator surface adjacent the caster support body;

at least one caster wheel mounted on an axle in the caster support body opposite the caster shaft, the axle offset from the vertical axis of the caster shaft;

a barrier-traversing member pivotally fastened to the axle of the at least one caster wheel of the caster support body, the barrier-traversing member including a barrier contact surface aligned in parallel with the at least one caster wheel, the barrier contact surface extending opposite the at least one caster wheel and beyond the vertical axis of the caster shaft;

the barrier-traversing member including a pair of parallel support arms, each arm pivotally attached at a first end to the axle of the at least one caster wheel and adjustably retaining a pulley wheel there between adjacent a second end of the pair of support arms, the adjustably retained pulley wheel mounted on an axle secured within a U-shaped clevis, said clevis maintained by an adjustment fastener secured between the pair of support arms, the pulley wheel mounted on an axle secured within a U-shaped clevis, said clevis maintained by an adjustment fastener secured between the pair of support arms;

the at least one caster wheel and the pulley wheel each include a circumferential groove therein with a wheel ramp belt member encircling the at least one caster wheel and the pulley wheel, the belt member positioned in said circumferential groove of said at least one caster wheel and said pulley wheel, said wheel ramp belt member having a trapezoidal cross section with a wider surface of the belt member contacting the groove on the circumference of the at least on caster wheel and the pulley wheel, thereby allowing space between edges of said V-belt and edges of said circumferential groove of said at least one caster wheel and said pulley wheel;

a brake pad support member attached at a first end to the barrier-traversing member opposite the barrier contact surface and extending toward the brake stator surface of the caster shaft housing, the brake pad support member second end having a brake pad member secured thereto, the brake pad member positioned adjacent the stator surface adjacent the caster support body, with, a brake support guide movably secured to the brake pad support member, the brake pad support member having an adjustment nut thereon, to further maintain the brake pad member adjacent the brake stator surface;

whereby the moving caster wheel assembly first contacts an obstacle with the barrier contact surface of the barrier-traversing member, thereby elevating the barrier-traversing member and attached brake pad support member and attached brake pad member into contact with the brake stator surface of the caster shaft housing, thereby restraining rotation of the caster support body and the at least one caster wheel thereof; and further movement of the rotation-restrained caster wheel assembly allowing the barrier-traversing member to elevate the at least one caster wheel, transferring load to said caster wheel, thereby allowing the barrier-traversing member to return to its starting position, and more easily traverse the obstacle.

15. The caster wheel assembly having a vertical axis brake and barrier-traversing member of claim 14, wherein the wheel ramp belt member includes a steel reinforced timing belt.

16. The caster wheel assembly having a vertical axis brake and barrier-traversing member of claim 14, further including an adjustment nut on the brake pad support member, the adjustment nut further maintaining the brake pad in position to contact the brake stator, the brake member support bracket including a portion offset from the brake stator surface providing adjustment of the brake pad member relative to the brake stator surface by the adjustment nut.

* * * * *